June 2, 1931. J. J. FREERKSEN 1,808,404
CUSHION TIRE
Filed May 13, 1929 2 Sheets-Sheet 1
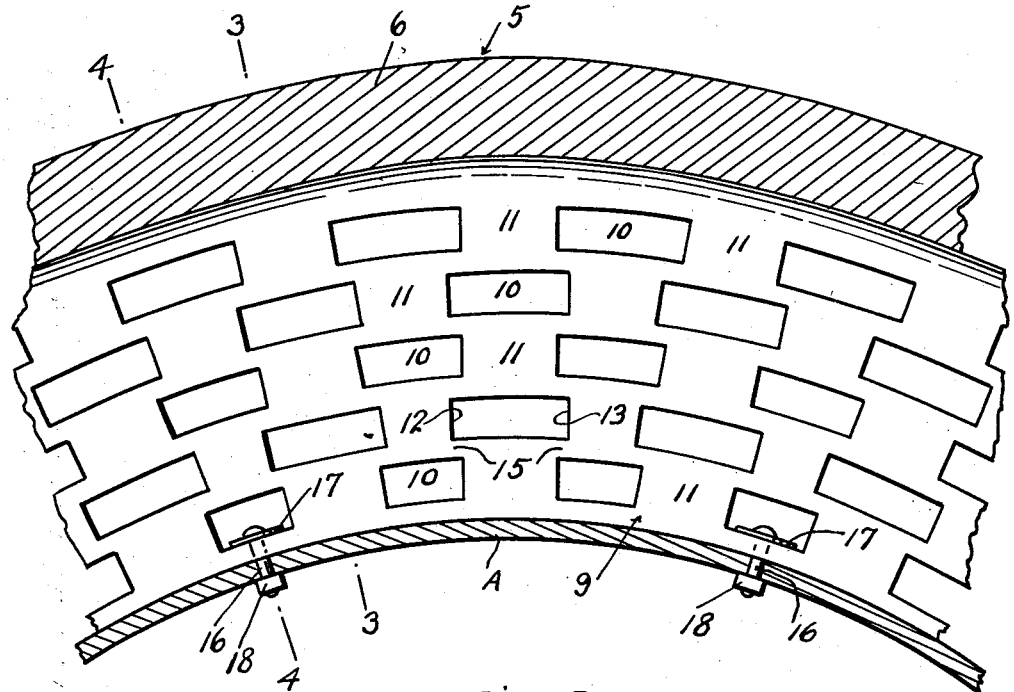
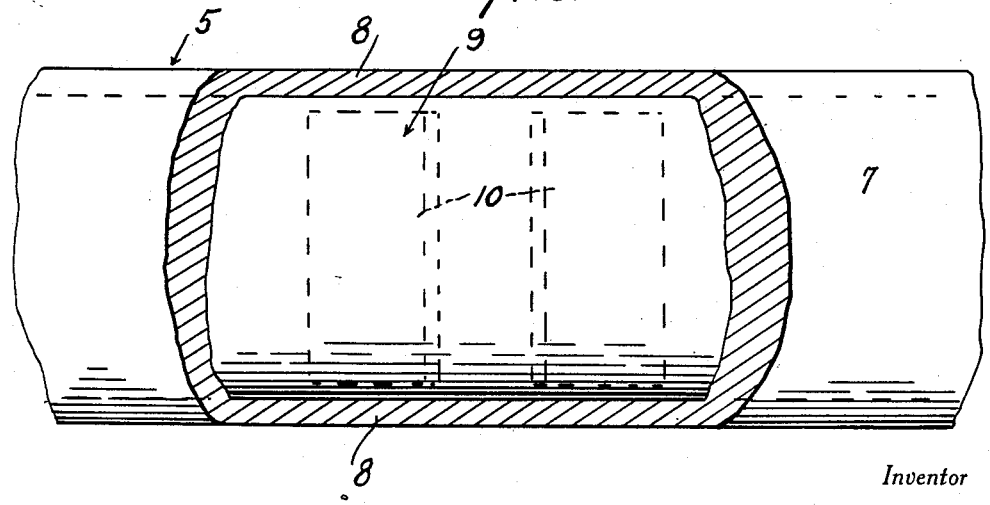
Inventor
John J. Freerksen
By Clarence A. O'Brien
Attorney June 2, 1931.   J. J. FREERKSEN   1,808,404
CUSHION TIRE
Filed May 13, 1929   2 Sheets-Sheet 2

Inventor
John J. Freerksen
By Clarence A. O'Brien
Attorney

Patented June 2, 1931

1,808,404

UNITED STATES PATENT OFFICE

JOHN J. FREERKSEN, OF STEAMBOAT ROCK, IOWA, ASSIGNOR OF ONE-FOURTH TO D. CLAASSEN, OF WELLSBURG, IOWA

CUSHION TIRE

Application filed May 13, 1929. Serial No. 362,524.

This invention relates to vehicle tires and more particularly to cushion tires of that type known as solid tires to distinguish them from pneumatic tires, as are frequently used on motor driven vehicles.

The primary object of the invention is to provide a tire of the above mentioned character wherein the construction is such as to permit the tire capable of use either within a casing, in a manner similar to an inner tube, or capable of use apart from the casing.

A further object of the invention is to provide a tire of the character stated wherein the tire is to be divided into a plurality of slots, the slots extending transversely of the tire, and the slots of each of the series being separated by solid portions of the tire running transversely thereof, and the solid portions and slots spaced in each of the respective series so as to be arranged in relation to one another in such a manner that the solid portions of one series will be directly in radial alinement with slots of the next adjacent series, and the slots of the respective series being of a width greater than the width of the solid portions between the slots of the preceding series so as to equip the tire with a novel and improved cushioning effect.

Other objects and advantages of the invention will become more apparent during a study of the following description taken in connection with the accompanying drawings, wherein:

Figure 1 is a longitudinal sectional view of a tire constructed in accordance with my invention.

Figure 2 is a fragmentary top plan view of the same with parts of the casing broken away to more clearly illustrate my improved tire or filler.

Figure 3:
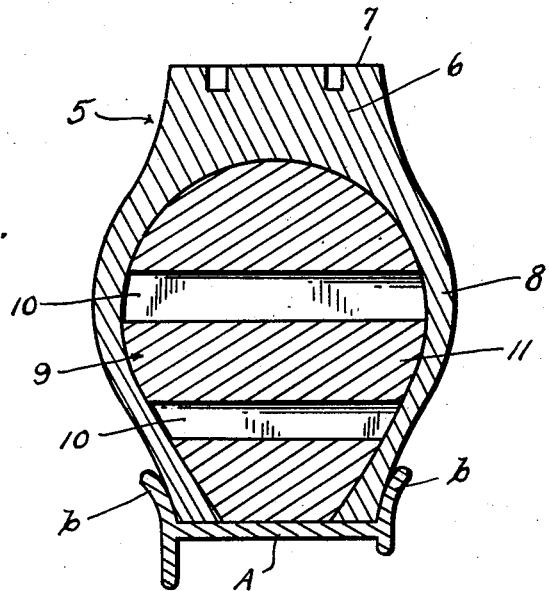
Figure 3 is a detail sectional view taken on line 3—3 of Figure 1.

With reference more in detail to the drawings it will be seen that the tire may be used in connection with an outer casing 5 provided with a relatively thick tread portion 6, having a tread face 7, and the said casing being further formed with side walls 8, said side walls 8 being relatively thin as disclosed in Figure 3.

In the drawings also, A represents a tire rim having the tire flanges $b$—$b$ formed thereon in the usual manner. The casing 5 may be secured to the rim between the flanges in the usual manner as shown in Figure 3. It is to be clearly understood that I have shown the construction of a rim and tire merely for illustrative purposes, and they have been herein alluded to in order to greatly clarify the invention.

Figure 4:
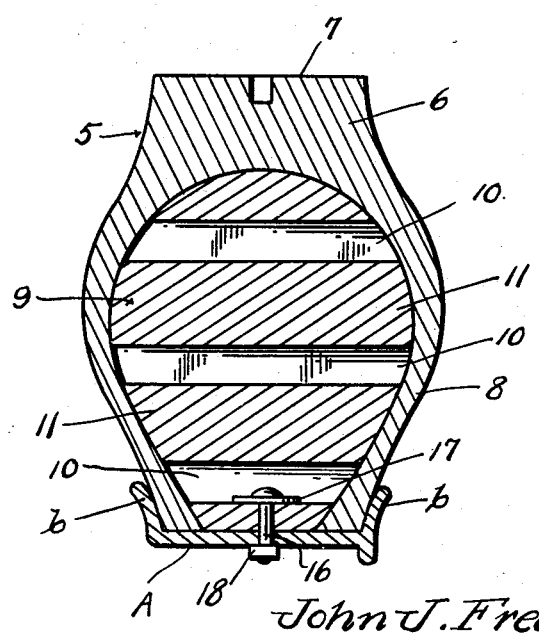
Figure 4 is a detail sectional view taken on line 4—4 of Figure 1.

The invention comprises a rubber mass 9 formed so as to be fully capable of being placed within a casing such as the casing 5 illustrated, much in the same manner as an inner tube, and in such a manner that the bottom surface of the mass will rest upon the rim as clearly shown in Figures 3 and 4 of the drawings.

The rubber mass 9 is preferably provided with five circumferential series of slots 10, which slots extend transversely entirely through the tire from side to side, and the slots of each series being separated sufficiently by solid portions 11 as best illustrated in Figure 1.

In Figure 1 it will also be noted that the slots 10 of one series are arranged in staggered relation to the slots of the next adjacent series. It is also to be noted that the solid portions 11 of the respective series are in radial alinement with the slots 10 of the respective series. It is also to be noted that the slots 10 in the adjacent series are wider than the solid portions between the slots in the preceding series so that the side walls 12 and 13 of the first mentioned slots will extend beyond the adjacent side walls of the slots in the preceding series as shown to advantage in Figure 1.

In so arranging the slots of the respective series in relation to one another it will be seen that the slots in the respective series are separated from one another at their overlapping ends by relatively narrow solid portions 15. This portion 15 between the slots of the respective sections acts as a cushion during lateral compression of the tire and at the same time is sufficient in thickness so as to render the tire thoroughly durable.

Thus it will be seen that I provide my improved tire with a plurality of series, each of said series comprising a plurality of slots having solid sections arranged in alternate relation to the slots, and in turn having the slots and solid sections of the series so arranged as to have the said solid sections of the respective series together with the slots of said respective series arranged in staggered relation to each other respectively.

In forming my improved tire in this manner and so arranging the series, the solid portions, and the slots, as described, I provide a tire that will give the proper cushioning effect, which cushioning effect is produced by the solid portions 15 between the overlapping ends of the slots, which solid portions 15 are of sufficient thickness as to render the tire strong and durable and fully capable of rough usage and wear to which such tires are subjected. When the tire is used either alone or within a casing so as to function in the nature of an inner tube, the same is secured to the tire rim by means of bolts 16 passing through openings formed in the rim and through the solid portion beneath certain of the slots 10 of the first series as shown in Figures 1 and 4. Thus it will be seen that the head of the bolts will extend within the slots to rest on a washer 17 through which the bolt is passed, while the opposite end of the bolt has threaded thereon a nut 18 whereby the tire and rim will be securely united.

From the foregoing then it will be seen that I have provided an improved tire, wherein the same may be made of one piece, can be manufactured at a moderate cost and will be strong and durable and thoroughly efficient for the purpose intended.

Even though I have herein shown and described the detailed structural elements and features of my invention, it is to be understood that the invention is capable of certain changes fully comprehended by the spirit of the invention as described and the scope of the appended claim.

Having thus described the invention, what I claim as new and desire to secure by Letters Patent is:—

A cushion tire composed of a ring of compressible elastic material provided with a series of radially alined openings elongated circumferentially of the ring and extending transversely of the tire from side to side with the openings of adjacent series in staggered and overlapping relation, alternate series of radially alined openings being shortest at the inner circumference of the tire and progressively increasing in elongation as they approach the "tread" of the tire and the intermediate series of radially alined openings being substantially of the same length.

In testimony whereof I affix my signature.
JOHN J. FREERKSEN.